US008051082B2

(12) United States Patent
Koran et al.

(10) Patent No.: US 8,051,082 B2
(45) Date of Patent: Nov. 1, 2011

(54) SYSTEM AND METHOD FOR FACILITATING INTERACTIVE SELECTION OF CLUSTERS AND PRESENTATION OF RELATED DATASETS

(75) Inventors: Joshua M. Koran, Mountain View, CA (US); David A. Burgess, Menlo Park, CA (US); Glen Anthony Ames, Mountain View, CA (US); Amit Umesh Shanbbag, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 311 days.

(21) Appl. No.: 11/642,444

(22) Filed: Dec. 19, 2006

(65) Prior Publication Data

US 2008/0147591 A1    Jun. 19, 2008

(51) Int. Cl.
*G06F 17/30* (2006.01)
(52) U.S. Cl. ........................................................ 707/737
(58) Field of Classification Search ............... 707/4, 737
See application file for complete search history.

(56) References Cited

U.S. PATENT DOCUMENTS

| | | | | |
|---|---|---|---|---|
| 5,983,220 A * | 11/1999 | Schmitt | | 707/5 |
| 6,026,397 A * | 2/2000 | Sheppard | | 707/5 |
| 6,061,658 A * | 5/2000 | Chou et al. | | 705/10 |
| 6,240,411 B1 * | 5/2001 | Thearling | | 707/5 |
| 6,567,797 B1 * | 5/2003 | Schuetze et al. | | 707/2 |
| 2008/0120307 A1 * | 5/2008 | Ames et al. | | 707/100 |

* cited by examiner

*Primary Examiner* — James Trujillo
*Assistant Examiner* — William Spieler
(74) *Attorney, Agent, or Firm* — Stattler-Suh PC (57) ABSTRACT

A system and method to facilitate interactive selection of groupings of clusters and presentation of related datasets are described. An interactive data interface is presented to a user in a display window, the interactive data interface configured to display multiple alternate groupings of clusters associated with at least one dataset of records targeted by the user. Selection of a grouping of clusters from the plurality of selectable groupings is further facilitated based on one or more predetermined parameters associated with each grouping of clusters and the individual clusters within a respective grouping, such as, for example, a target ratio value and a target count value corresponding to each cluster of records.

24 Claims, 6 Drawing Sheets

SYSTEM AND METHOD FOR FACILITATING INTERACTIVE SELECTION OF CLUSTERS AND PRESENTATION OF RELATED DATASETS

TECHNICAL FIELD

The present invention relates generally to computer applications and, more particularly, to a system and method to facilitate interactive selection of groupings of clusters and presentation of related datasets.

BACKGROUND OF THE INVENTION

Marketing is the art of reaching the right customer or consumer, with the right message at the right time. Since marketers cannot afford to craft unique messages for each targeted individual, they always deal with large segments of their target market at any given time.

Data clustering is often used to help such marketers target the appropriate segments of individuals. However, it is often difficult to determine the best clustering of a dataset. The number of possible groupings of records into clusters is extremely large. The possibilities range between all records being in a single cluster to each record being its own cluster. As a result, a comparison among alternate possible groupings of clusters belonging to the same dataset is difficult to efficiently determine. Heuristics are often used to determine which of the possible groupings of clusters is superior to alternate groupings for a particular dataset. Thus, what is needed is a system and method to help marketers in identifying the ideal number of clusters for their dataset.

SUMMARY OF THE INVENTION

A system and method to facilitate interactive selection of groupings of clusters and presentation of related datasets are described. An interactive data interface is presented to a user in a display window, the interactive data interface configured to display multiple alternate groupings of clusters associated with at least one dataset of records. Selection of a grouping of clusters from the plurality of selectable groupings is further facilitated based on one or more predetermined parameters associated with each grouping of clusters and the individual clusters within a respective grouping, such as, for example, a target ratio value and a target count value corresponding to each cluster of records.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

In embodiments described in detail below, a dataset of records targeted by a user is processed using one of many known data clustering techniques to obtain multiple alternate groupings of clusters. An interactive data interface is presented to the user interested in determining which grouping of clusters best segments the available dataset. The interactive data interface displays the alternate groupings of clusters and a predetermined number of parameters or metrics associated with each grouping of clusters.

In some embodiments, selection by the user of a grouping from the plurality of selectable groupings is further facilitated based on one or more predetermined parameters associated with the groupings of clusters and the individual clusters, such as, for example, a target ratio value and a record count value for each cluster of records. In alternate embodiments, an optimal grouping of clusters is determined for the user based on one or more parameters and the suggested optimal grouping is further indicated to the user in the interactive data interface.

Figure 1:
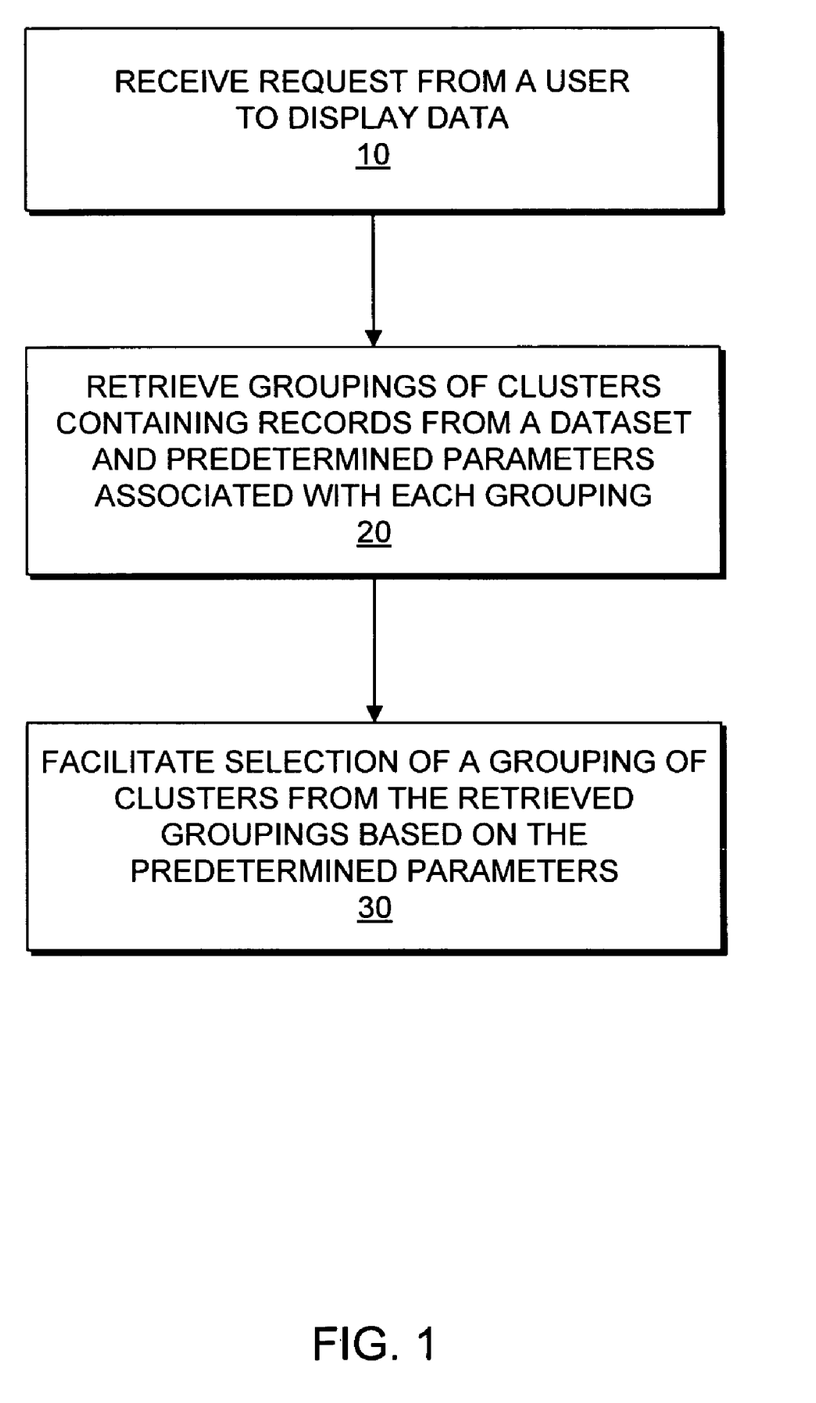
FIG. 1 is a flow diagram illustrating a processing sequence to facilitate selection of groupings of clusters and presentation of related datasets, according to one embodiment of the invention.

FIG. 1 is a flow diagram illustrating a processing sequence to facilitate interactive selection of groupings of clusters and presentation of related datasets. As shown in FIG. 1, at processing block 10, the sequence starts with receipt of a request to display data, such as multiple groupings of clusters, each cluster containing a number of records associated with a dataset targeted by a user. In one embodiment, the user connects to an entity and transmits a request to display data, as described in further detail below. Alternatively, the user may connect to the entity via a network to transmit the request to display data.

Next, at processing block 20, the groupings of clusters and predetermined parameters associated with each grouping are retrieved. In one embodiment, the entity receives the user request and accesses a data storage module to retrieve the requested groupings of clusters and associated parameters, which characterize each grouping of clusters, as described in further detail below.

Finally, at processing block 30, a selection of a grouping of clusters from the retrieved groupings is facilitated based on one or more of the predetermined parameters. In one embodiment, the user selects one of the retrieved groupings of clusters, as described in further detail below. Alternatively, the entity generates automatically a selection of an optimal grouping of clusters based on at least one retrieved parameter, as described in detail below.

Figure 2:
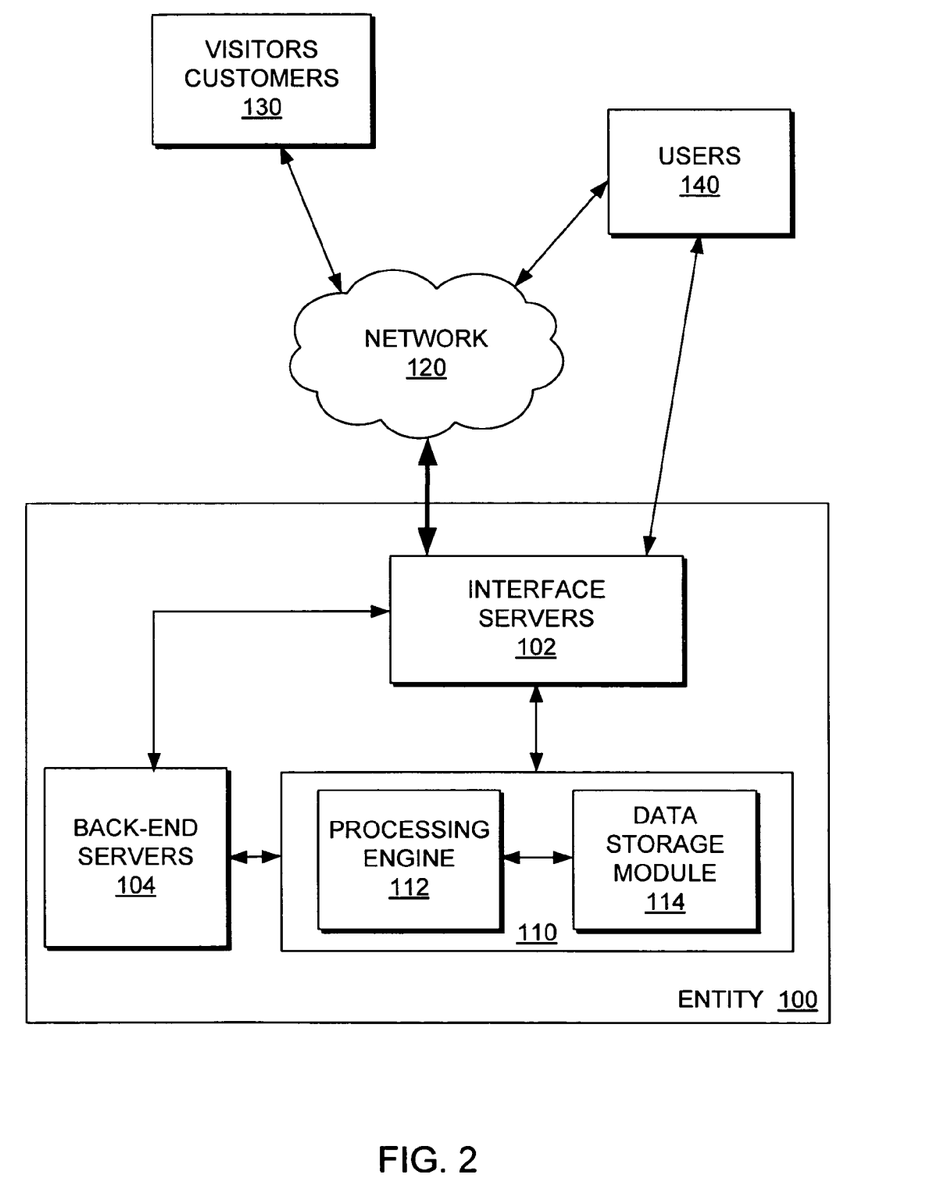
FIG. 2 is a block diagram illustrating an exemplary entity containing a system to facilitate interactive selection of groupings of clusters and presentation of related datasets, according to one embodiment of the invention.

FIG. 2 is a block diagram illustrating an exemplary entity containing a system to facilitate interactive selection of groupings of clusters and presentation of related datasets. While an exemplary embodiment of the present invention is described within the context of an entity 100 enabling such selection and presentation operations, it will be appreciated by those skilled in the art that the invention will find application in many different types of computer-based, and network-based, entities, such as, for example, commerce entities, content provider entities, or other known entities communicating directly with users or having a presence on the network.

In one embodiment, the entity 100, such as, for example, an Internet portal, includes one or more front-end interface servers 102, which may, for example, deliver web pages to multiple visitors or customers 130, (e.g., markup language documents), handle search requests to the entity 100, provide automated communications to/from visitors/customers 130 of the entity 100, deliver images to be displayed within the web pages, deliver content information to the visitors/customers 130. In one embodiment, the front-end interface servers 102 are further configured to provide interface capabilities to one or more users 140, such as, for example, marketers or other users of applications residing within the entity 100, and to enable such users 140 to communicate with the entity 100, either directly or through a network 120. Alternatively, the entity 100 may include a number of additional front-end servers (not shown), which provide an intelligent interface to the back-end of the entity 100.

In one embodiment, the entity 100 further includes one or more back-end servers 104 coupled to the front-end interface servers 102, such as, for example, processing servers, data storage servers, advertising servers, and other known servers, and a system 110 to facilitate interactive selection of groupings of clusters and presentation of related datasets, as described in further detail below, the system 110 being coupled to the front-end interface servers 102 and the back-end servers 104.

In one embodiment, the system 110 further includes a processing engine 112 coupled to a data storage module 114. The processing engine 112 may include software and/or hardware modules configured to perform selection and presentation operations, as described in further detail below. The data storage module 114, which at least partially implements and supports the system 110, may include one or more storage facilities, such as a database or collection of databases, which may be implemented as relational databases. Alternatively, the data storage module 114 may be implemented as a collection of objects in an object-oriented database, as a distributed database, or any other such databases. The data storage module 114 is accessible by the processing engine 112 and stores datasets of records targeted by users 140.

In one embodiment, the visitors/customers 130 and the users 140 may access the entity 100 through a client machine (not shown) coupled to the visitors/customers 130 and the users 140 or, in the alternative, through a client program, such as a browser (e.g., the Internet Explorer browser distributed by Microsoft Corporation of Redmond, Wash.), that executes on the client machine and accesses the facility 100 via the network 120, such as, for example, the Internet. Other examples of networks that a client may utilize to access the entity 100 includes a wide area network (WAN), a local area network (LAN), a wireless network (e.g., a cellular network), the Plain Old Telephone Service (POTS) network, or other known networks.

Figure 3:
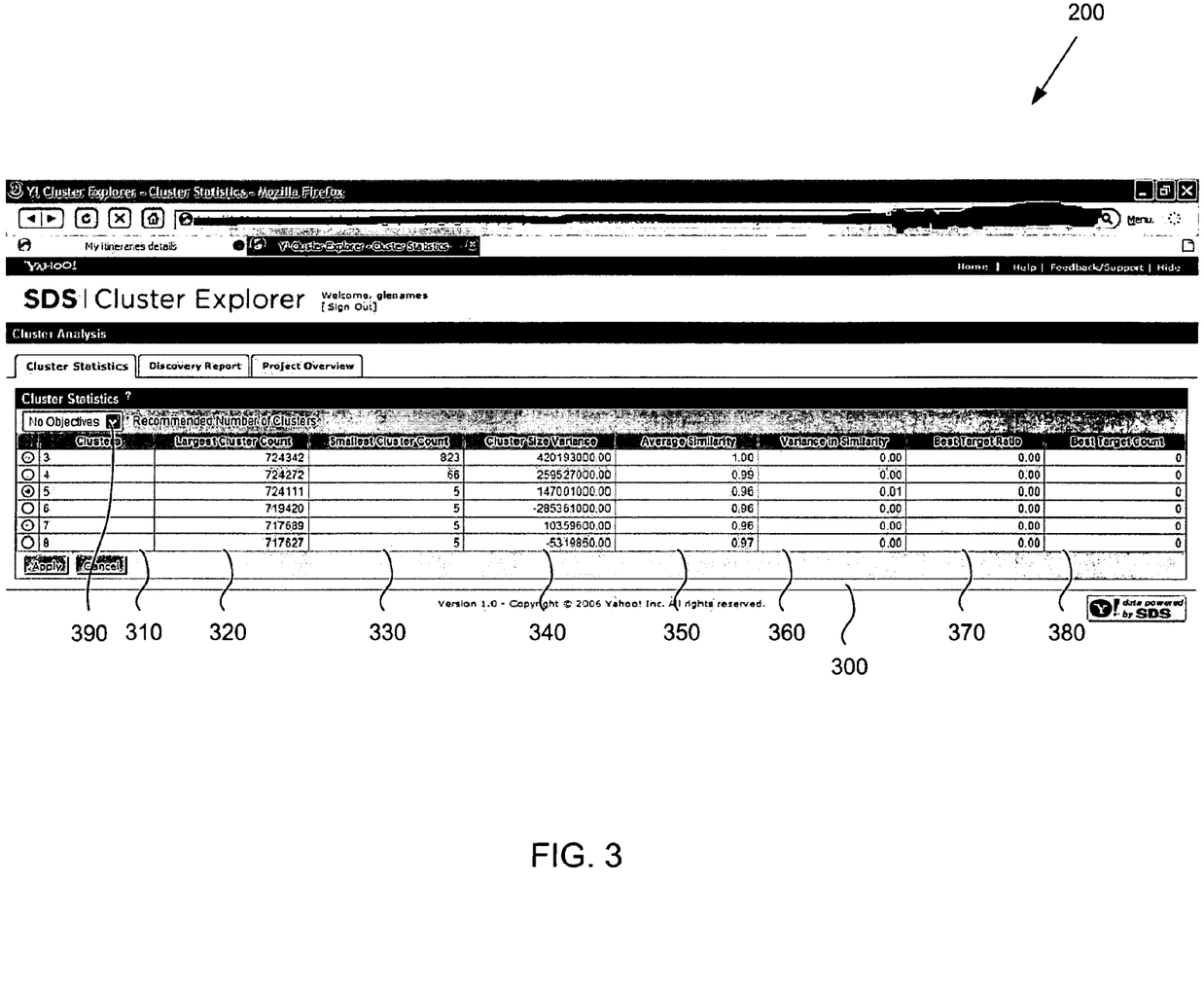
FIG. 3 is an exemplary illustration of a data interface to facilitate interactive selection of groupings of clusters and presentation of related datasets, according to one embodiment of the invention.

FIG. 3 is an exemplary illustration of an interactive data interface to facilitate interactive selection of groupings of clusters and presentation of related datasets. The entity 100 presents the interactive data interface 200 to a user 140 within a display window of the client machine connected to the user 140. The data interface 200 facilitates communications between the user 140 and the entity 100 and display of data requested by the user 140.

As shown in FIG. 3, in one embodiment, the data interface 200 includes multiple interactive areas, such as, for example, a cluster statistics area 300, which is configured to implement embodiments of the method to facilitate selection of groupings of clusters and presentation of related datasets, as described in detail below.

In one embodiment, the cluster statistics area 300 includes multiple columns, such as, for example, a clusters column 310, which displays alternate groupings of clusters containing individuals/records within the dataset, and a number of predetermined parameter columns 320 through 380, which display respective parameter values associated with each grouping of clusters.

In one embodiment, a "Largest Cluster Count" column 320 displays a largest cluster count value for each respective grouping of clusters displayed in the clusters column 310. A "Smallest Cluster Count" column 330 displays a smallest cluster count value for each respective grouping of clusters displayed in the clusters column 310. Other conventional parameter-columns, which display known parameter values, may include, for example, a "Cluster Size Variance" column 340, an "Average Similarity" column 350, and a "Variance in Similarity" column 360, each being configured to display respective values associated with each grouping of clusters displayed in the clusters column 310. In an alternate embodiment, the cluster sizes and other parameter values may be displayed in tabular or graphical form.

In one embodiment, the cluster statistics area 300 further includes a "Best Target Ratio" column 370 and a "Best Target Count" column 380, which partially implement embodiments of the method to facilitate selection of groupings of clusters and presentation of related datasets, as described in detail below.

The "Best Target Ratio" column 370 displays highest target ratio parameter values assigned to a cluster within each grouping of clusters displayed within the clusters column 310. The target ratio parameter value is defined as a ratio of "good" records divided by the total number of individuals/records within a specific cluster. In an alternate embodiment, the target ratio parameter values may be displayed in tabular or graphical form.

A "good" record may be defined as a record that possesses a user-specified subset of selected attributes, which are then used to score each record on a scale ranging from desirable to undesirable to the particular user/marketer. In one example, if ten percent of all individuals/records within a cluster have purchased a product in a clustering where the user/marketer is trying to identify attributes that will correlate to potential future customers, the target ratio parameter value for that cluster would be 10% when the marketer selects the all the records of that cluster.

The "Best Target Count" column 380 displays highest target record count values assigned to a cluster within each grouping of clusters displayed within the clusters column 310. The target count parameter value assigned to each cluster may be defined as the highest number of "good" individuals/records within the associated cluster. In an alternate embodiment, the target count values may be displayed in tabular or graphical form.

In one embodiment, the-cluster statistics area 300 further includes a pull-down menu 390 containing objectives specified by the user 140, which, when selected with a conventional mouse click command, direct the display of proposed alternate groupings of clusters in the clusters column 310.

Figure 4:
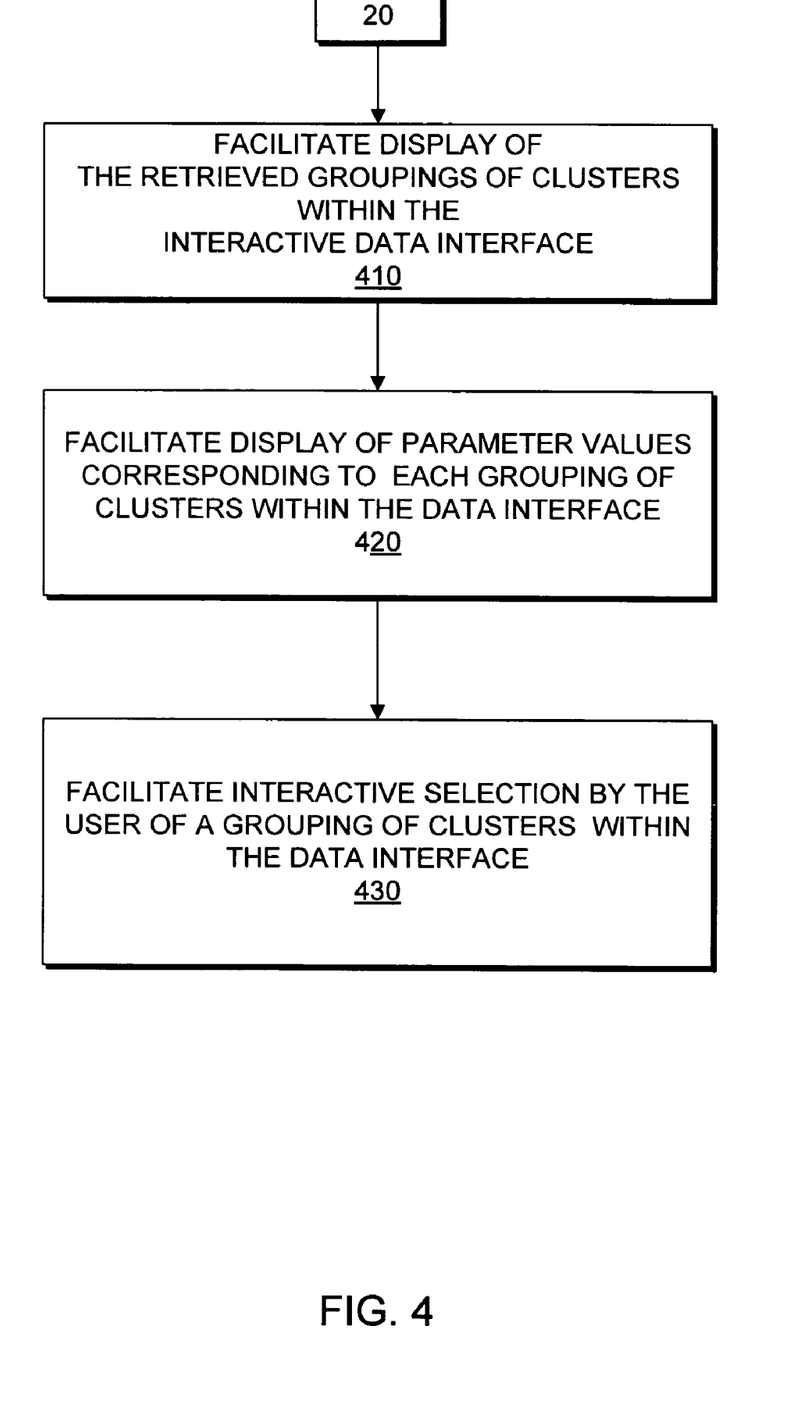
FIG. 4 is a flow diagram illustrating a method to facilitate interactive selection of groupings of clusters and presentation of related datasets, according to one embodiment of the invention.

FIG. 4 is a flow diagram illustrating a method to facilitate interactive selection of groupings of clusters and presentation of related datasets, according to one embodiment of the invention. As illustrated in FIG. 4, subsequent to receipt from a user 140 of a request to display data, at processing block 410, display of multiple groupings of clusters of records within the data interface 200 is facilitated.

In one embodiment, a user 140 accesses the entity 100 either directly or via the network 120 and transmits a request to display data, such as multiple groupings of clusters, each cluster containing a number of records associated with a dataset targeted by the user. The user may, for example, select an objective from the pull-down menu 390 of the cluster statistics area 300 within the data interface 200 and transmit the objective selection to the entity 100.

The interface servers 102 receive the user request, such as, for example, the selected objective, and transmit the request to the processing engine 112 within the system 110. The processing engine 112 accesses the data storage device 114 to retrieve or generate the corresponding groupings of clusters from the data storage module 114. The processing engine 112 then transmits the proposed groupings of clusters to the user 140 for further display in the clusters column 310 of the cluster statistics area 300.

At processing block 420, display of multiple parameter values for the predetermined parameters corresponding to each grouping of clusters within the data interface 200 is further facilitated. In one embodiment, the processing engine 112 further accesses the data storage module 114 to retrieve parameter values associated with each retrieved grouping, such as, for example, conventional parameter values, target ratio parameter values, and/or target count parameter values, previously calculated for each cluster within the dataset, and stored within the data storage module 114. The processing engine 112 then transmits the retrieved parameter values to the user 140 for further display in the respective parameter columns 320 through 380 of the cluster statistics area 300.

Finally, at processing block 430, interactive selection of a grouping of clusters by the user 140 is facilitated through the data interface 200. In one embodiment, the user 140 selects a grouping of clusters from the clusters column 310 of the cluster statistics area 300 within the data interface 200 based on one or more of the respective parameter values displayed within the parameter columns 320 through 380.

In one embodiment, the user 140 may select an optimal grouping of clusters based only on the target ratio parameter values. Alternatively, the user 140 may select an optimal grouping of clusters based only on the target count parameter values. In another alternate embodiment, the user 140 may select an optimal grouping of clusters based on a combination of target ratio parameter values and target count parameter values. In yet another alternate embodiment, the user 140 may select an optimal grouping of clusters based on a combination of target ratio parameter values and/or target count parameter values, and other conventional parameter values displayed within the parameter columns 320 through 360 of the data interface 200. In yet another alternate embodiment, the user may select a subset of the clusters within the groupings of clusters and compare parameter values of only these alternate subsets.

Figure 5:
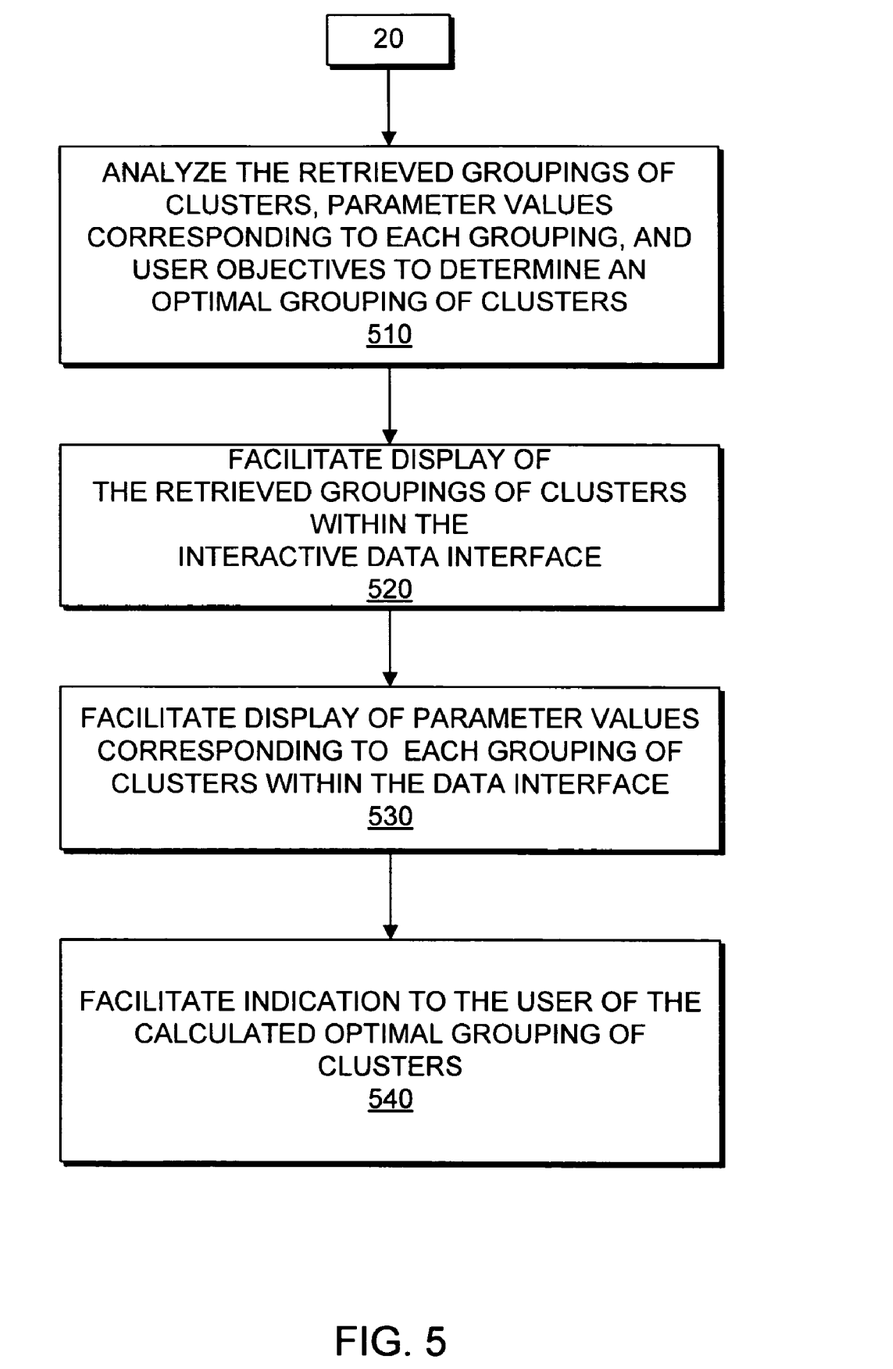
FIG. 5 is a flow diagram illustrating a method to facilitate automatic selection of groupings of clusters and presentation of related datasets, according to an alternate embodiment of the invention.

FIG. 5 is a flow diagram illustrating a method to facilitate automatic selection of groupings of clusters and presentation of related datasets, according to an alternate embodiment of the invention. As illustrated in FIG. 5, subsequent to receipt from a user 140 of a request to display data, at processing block 510, the retrieved groupings of clusters, parameter values corresponding to each grouping, and user objectives are analyzed to determine an optimal grouping from the retrieved groupings of clusters to be transmitted to the user 140.

In one embodiment, a user 140 accesses the entity 100 either directly or via the network 120 and transmits a request to display data, such as multiple groupings of clusters, each cluster containing a number of records associated with a dataset targeted by the user. The user may, for example, select an objective from the pull-down menu 390 of the cluster statistics area 300 within the data interface 200 and transmit the objective selection to the entity 100.

The interface servers 102 receive the user request, such as, for example, the selected objective, and transmit the request to the processing engine 112 within the system 110. The processing engine 112 accesses the data storage device 114 to retrieve or generate the corresponding groupings of clusters from the data storage module 114.

In one embodiment, the processing engine 112 further accesses the data storage module 114 to retrieve parameter values associated with each retrieved grouping, such as, for example, conventional parameter values, target ratio parameter values, and/or target count parameter values, previously calculated for each cluster within the dataset and stored within the data storage module 114. The processing engine 112 then analyzes the groupings of clusters, the user objectives, and the retrieved parameter values to determine an optimal grouping of clusters for the user 140.

Conventionally, the number of clusters in a dataset is determined when the distance between clusters (either between centroid points or between edges of the clusters), whose average distance decreases with the addition of each new cluster, decreases less than the average decrease in distance for all previous additions (i.e., when an inflection point in distance is observed when plotted against the number of clusters). Because this distance function does not take into consideration the distribution of "good" and "bad" records within each cluster, it may not be as desirable as an alternate grouping of clusters that contains an alternate ratio of "good" to "bad" records within each cluster.

In one embodiment, the target ratio of "good" to "bad" records per cluster may be used to determine the optimal grouping of clusters within a dataset. The ratio of value (e.g., sum of revenue) rather than the count (e.g., count of customers) of "good" to "bad" records may also be used to determine the optimal grouping of clusters within a dataset. In addition to the ratio determination, the count of "good" records in the clusters containing the greatest ratio of "good" to "bad" records may be used to determine the optimal grouping of clusters within a dataset. The function to determine the optimal grouping may rely on either an average or maximization formula of the above mentioned ratio and/or the count of "good" records per cluster in each grouping of clusters. Alternatively, the number of "bad" records can be used in the above methods to determine the optimal grouping of clusters.

In a specific example, the optimal grouping of clusters is determined via either an average or maximization function of the target ratio and the target count value of "good" and "bad" records within each cluster for each grouping of clusters. In one example, to determine the average function, each cluster's ratio of "good" and "bad" records is multiplied by a function of the number or value of the "good" records, the results from which are averaged:

$$\sum_{x \in X} \frac{f(x)}{|X|},$$

where $$X = \left\{ \left( \frac{good}{bad}, good \right) \right\}$$

where |X| is equal to the number of clusters and the function incorporates the user-defined weighting between ratio of "good" to "bad" records and the count of "good" records per cluster.

To determine the maximization function, the maximum is sought of each cluster's ratio of "good" and "bad" records when multiplied by a function of the count value of the good records.

$$\max_{x \in X} f(x),$$

where $$X = \left\{ \left( \frac{\text{good}}{\text{bad}}, \text{good} \right) \right\}$$

The function f(x) incorporates the user-defined weighting between the ratio of "good" to "bad" records and the number of "good" records per cluster. In an alternate example, the optimal grouping of clusters can be determined by referencing the "bad" records using either an average or minimization of "bad" records in lieu of the two formulas above.

In one embodiment, the processing engine 112 may determine an optimal grouping of clusters based only on the target ratio parameter values. Alternatively, the processing engine 112 may determine an optimal grouping of clusters based only on the target count parameter values. In another alternate embodiment, the processing engine 112 may determine an optimal grouping of clusters based on a combination of target ratio parameter values and target count parameter values. In yet another alternate embodiment, the processing engine 112 may determine an optimal grouping of clusters based on a combination of target ratio parameter values and/or target count parameter values, and other conventional parameter values displayed within the parameter columns 320 through 360 of the data interface 200.

At processing block 520, display of the retrieved groupings of clusters within the data interface 200 is facilitated. In one embodiment, the processing engine 112 transmits the proposed groupings of clusters to the user 140 for further display in the clusters column 310 of the cluster statistics area 300.

At processing block 530, display of the retrieved parameter values for the predetermined parameters corresponding to each grouping of clusters within the data interface 200 is further facilitated. In one embodiment, the processing engine 112 then transmits the retrieved parameter values to the user 140 for further display in the respective parameter columns 320 through 380 of the cluster statistics area 300.

Finally, at processing block 540, indication to the user 140 of the calculated optimal grouping of clusters is facilitated. In one embodiment, the processing engine 112 facilitates display within the clusters column 310 of the cluster statistics area 300 of an indication of the calculated optimal grouping of clusters, for example through a symbol displayed adjacent to the selected grouping within the clusters column 310.

Figure 6:
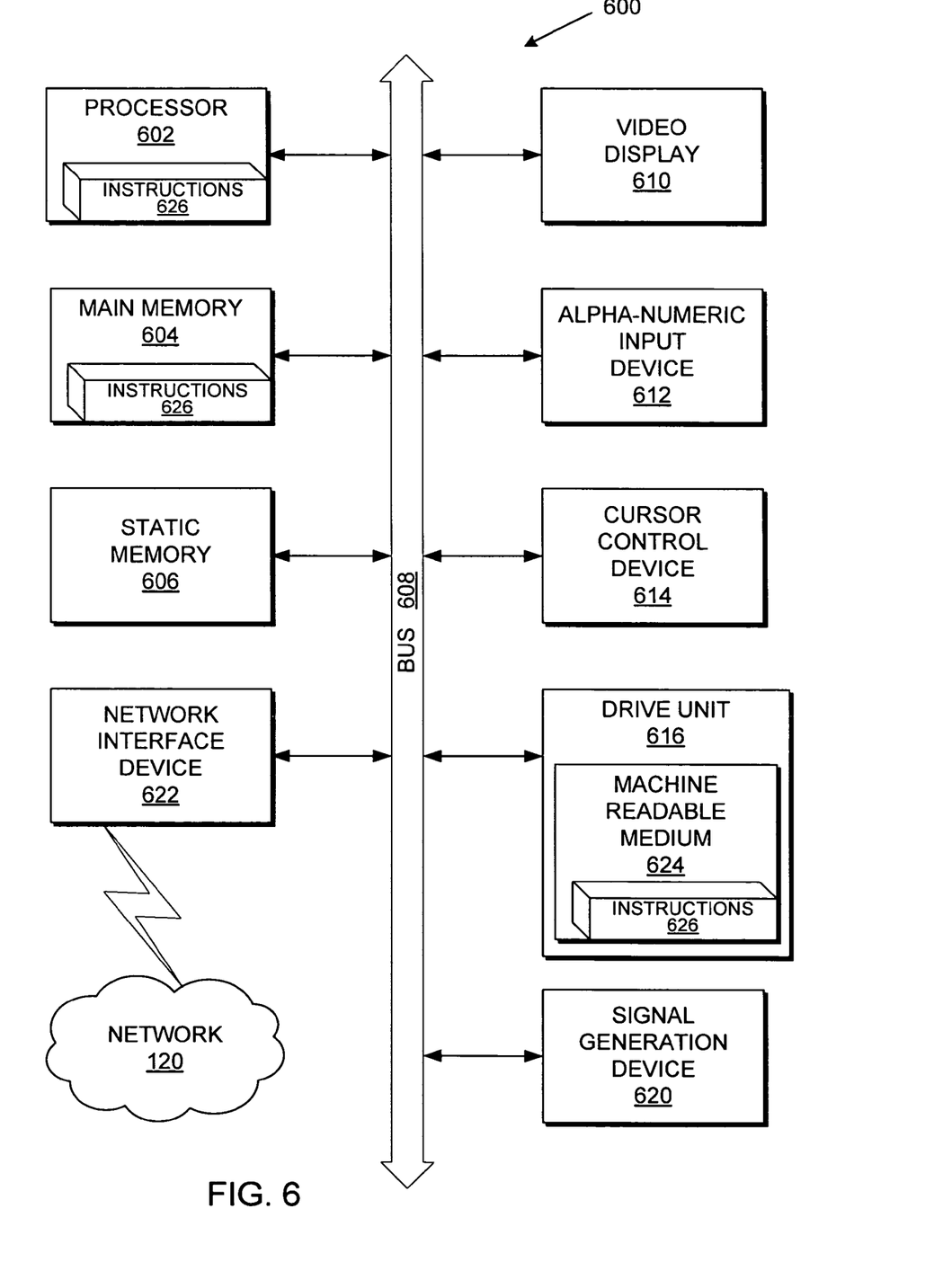
FIG. 6 is a diagrammatic representation of a machine in the exemplary form of a computer system within which a set of instructions may be executed.

FIG. 6 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker), and a network interface device 620.

The disk drive unit 616 includes a machine-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 620.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer-implemented method comprising:
    receiving, at a computer, a plurality of clusters associated with at least one dataset of records possessing dataset attributes, and a plurality of user-specified attributes wherein the user-specified attributes denote values corresponding to the dataset attributes;
    determining, using a computer, a target ratio for each of the clusters, wherein the target ratio comprises a number of records that possess the user specified attributes within each cluster divided by a total number of records within each cluster;
    determining, using a computer, a target count for each of the clusters, wherein the target count comprises the number of records that possess the user specified attributes within each cluster;
    receiving, at a computer, a user defined weight; and
    determining, in a computer, an optimal grouping of clusters using at least one of:
    an average function, wherein the average function incorporates the target ratio, the target count, and the user-defined weight, and
    a maximization function, wherein the maximization function incorporates the target ratio, the target count, and the user-defined weight.

2. The computer-implemented method according to claim 1, further comprising:
    presenting an interactive data interface to a user in a display window, said interactive data interface displaying a plurality of groupings of said clusters associated with at least one dataset of records targeted by said user;

selecting a grouping from said groupings of said clusters based on at least one predetermined parameter associated with each grouping of clusters within said plurality of groupings and displayed within said interactive data interface;

retrieving said plurality of groupings of said clusters from a data storage module in response to a data request from said user; and retrieving parameter values associated with said at least one predetermined parameter from said data storage module in response to said data request.

3. The computer-implemented method according to claim 2, wherein retrieving said plurality of groupings of clusters further comprises:

selecting at least one user objective within said interactive data interface, said at least one user objective to determine said plurality of groupings of clusters displayed within said data interface.

4. The computer-implemented method according to claim 2, wherein said selecting said grouping is performed in response to a command received from said user through said interactive data interface.

5. The computer-implemented method according to claim 2, wherein said selecting further comprises:

analyzing said retrieved groupings of clusters and said parameter values to determine said selected grouping of clusters; and facilitating indication of said selected grouping of clusters to said user within said data interface.

6. The computer-implemented method according to claim 2, wherein said at least one predetermined parameter further comprises the target ratio associated with each cluster within said selected grouping.

7. The computer-implemented method according to claim 2, wherein said at least one predetermined parameter further comprises the target count associated with each cluster within said selected grouping.

8. The computer-implemented method according to claim 2, wherein said at least one predetermined parameter further comprises the target ratio and the target count associated with each cluster within said selected grouping.

9. A system, comprising:

a data storage module to store at least one dataset of records targeted by a user; and a processing engine coupled to said data storage module, wherein said processing engine:

receives a plurality of clusters associated with at least one dataset of records possessing dataset attributes, and a plurality of user-specified attributes wherein the user-specified attributes denote values corresponding to the dataset attributes;

determines a target ratio for each of the clusters, wherein the target ratio comprises a number of records that possess the user specified attributes within each cluster divided by a total number of records within each cluster;

determines a target count for each of the clusters, wherein the target count comprises the number of records that possess the user specified attributes within each cluster;

receives a user defined weight; and determining an optimal grouping of clusters using at least one of:

an average function, wherein the average function incorporates the target ratio, the target count, and the user-defined weight, and a maximization function, wherein the maximization function incorporates the target ratio, the target count, and the user-defined weight.

10. The system according to claim 9, wherein said processing engine further: presents an interactive data interface to a user in a display window, said interactive data interface displaying a plurality of groupings of said clusters associated with at least one dataset of records targeted by said user; selects a grouping from said groupings of said clusters based on at least one predetermined parameter associated with each grouping of clusters within said plurality of groupings and displayed within said interactive data interface; retrieves said plurality of groupings of clusters from said data storage module in response to a data request from said user; and retrieves parameter values associated with said at least one predetermined parameter from said data storage module in response to said data request.

11. The system according to claim 10, wherein said processing engine further selects at least one user objective within said interactive data interface, said at least one user objective to determine said plurality of groupings of clusters displayed within said data interface.

12. The system according to claim 10, wherein said processing engine further selects said grouping in response to a command received from said user through said interactive data interface.

13. The system according to claim 10, wherein said processing engine further analyzes said retrieved groupings of clusters and said parameter values to determine said selected grouping of clusters, and facilitates indication of said selected grouping of clusters to said user within said data interface.

14. The system according to claim 10, wherein said at least one predetermined parameter further comprises the target ratio associated with each cluster within said selected grouping.

15. The system according to claim 10, wherein said at least one predetermined parameter further comprises the target count associated with each cluster within said selected grouping.

16. The system according to claim 10, wherein said at least one predetermined parameter further comprises the target ratio and the target count associated with each cluster within said selected grouping.

17. A computer readable medium containing executable instructions stored thereon, which, when executed in a processing system, cause said processing system to perform a method comprising:

receiving, at a computer, a plurality of clusters associated with at least one dataset of records possessing dataset attributes, and a plurality of user-specified attributes wherein the user-specified attributes denote values corresponding to the dataset attributes;

determining, using a computer, a target ratio for each of the clusters, wherein the target ratio comprises a number of records that possess the user specified attributes within each cluster divided by a total number of records within each cluster;

determining, using a computer, a target count for each of the clusters, wherein the target count comprises the number of records that possess the user specified attributes within each cluster;

receiving, at a computer, a user defined weight; and determining an optimal grouping of clusters using at least one of:

an average function, wherein the average function incorporates the target ratio, the target count, and the user-defined weight, and a maximization function, wherein the maximization function incorporates the target ratio, the target count, and the user-defined weight.

18. The computer readable medium according to claim 17, wherein said method further comprises:
    presenting an interactive data interface to a user in a display window, said interactive data interface displaying a plurality of groupings of said clusters associated with at least one dataset of records targeted by said user;
    selecting a grouping from said groupings of said clusters based on at least one predetermined parameter associated with each grouping of clusters within said plurality of groupings and displayed within said interactive data interface;
    retrieving said plurality of groupings of clusters from a data storage module in response to a data request from said user; and
    retrieving parameter values associated with said at least one predetermined parameter from said data storage module in response to said data request.

19. The computer readable medium according to claim 18, wherein retrieving said plurality of groupings of clusters further comprises:
    selecting at least one user objective within said interactive data interface, said at least one user objective to determine said plurality of groupings of clusters displayed within said data interface.

20. The computer readable medium according to claim 18, wherein said selecting said grouping is performed in response to a command received from said user through said interactive data interface.

21. The computer readable medium according to claim 18, wherein said selecting further comprises:
    analyzing said retrieved groupings of clusters and said parameter values to determine said selected grouping of clusters; and
    facilitating indication of said selected grouping of clusters to said user within said data interface.

22. The computer readable medium according to claim 17, wherein said at least one predetermined parameter further comprises the target ratio associated with each cluster within said selected grouping.

23. The computer readable medium according to claim 17, wherein said at least one predetermined parameter further comprises the target count associated with each cluster within said selected grouping.

24. The computer readable medium according to claim 17, wherein said at least one predetermined parameter further comprises the target ratio and the target count associated with each cluster within said selected grouping.

* * * * *